United States Patent [19]
Braddon

[11] 3,772,692
[45] Nov. 13, 1973

[54] MARINE RADAR-BEACON TRANSPONDER NAVIGATION AND COLLISION AVOIDANCE SYSTEM

[75] Inventor: Frederick D. Braddon, Babylon, N.Y.
[73] Assignee: Sperry Rand Corporation, New York, N.Y.
[22] Filed: Jan. 5, 1972
[21] Appl. No.: 215,521

[52] U.S. Cl.......... 343/6 R, 343/5 PC, 343/112 CA
[51] Int. Cl............................................... G01s 9/02
[58] Field of Search............ 343/5 PC, 6 R, 112 CA

[56] References Cited
UNITED STATES PATENTS
2,979,714  4/1961  Wallace......................... 343/5 PC X
3,312,970  4/1967  Bond.................................... 343/6 R
3,179,933  4/1965  Hahnel................................ 343/6 R
3,001,192  9/1961  Hammond et al............ 343/5 PC X Primary Examiner—T. H. Tubbesing
Attorney—Howard P. Terry

[57] ABSTRACT

A marine radar-beacon transponder navigation and collision avoidance system provides facilities for early detection of, identification of, and communication with cooperating marine vessels by virtue of the integration of the radar and radio transponder systems of the ships into a complete intelligence processing system permitting early detection and identification of any two stations, additionally providing an intelligence conveying link therebetween. Any collision threat situation and its participants are identified by cooperative reference to the radar plan position indicator or to a permanent plotted record which displays dangerous constant bearing intruders as specially characterized and easily recognized lines.

9 Claims, 5 Drawing Figures

MARINE RADAR-BEACON TRANSPONDER NAVIGATION AND COLLISION AVOIDANCE SYSTEM

BACKGROUND OF THE INVENTION

1. Field of the Invention

The invention pertains to an integrated radio detection, navigation, and communication system for affording safe navigation at sea and more particularly relates to radar-radar beacon-communication systems for operation between cooperating vessels and for permitting early detection and identification of any intruding vessel such as may be following a dangerous constant bearing course relative to own ship.

2. Description of the Prior Art

Early warning of the presence of an intruding vessel is a requisite for the prevention of accidents between vessels, especially in crowded traffic and in the instant of ships having limited maneuverability. Because of their great momentum, large cargo vessels, for example, are slow to respond to applied rudder or to propeller thrust. Consequently, such vessels travel large distances before appreciable changes in course or speed can be effected. The greater the tonnage of the vessel or the greater its speed, the greater is this distance. On the other hand, at the reduced speeds often used in heavy traffic or in restricted navigation areas, the ship's rudder may become even less effective. Ships of such characteristics have come increasingly into use, and it is required that corrective action in collision-prone situations involving such vessels be determined with accuracy and be initiated early if they are to be effective.

While conventional radar instruments have been of assistance in the collision avoidance function, the typical radar presentation is not always easy to interpret, especially in bad weather. Increasing time is required to comprehend the general situation, to recognize moving targets and other hazards, and then to select a course and speed for gaining safe passage through the dynamic neighborhood pattern. While rather complex computer and display devices have been proposed for performing this function, there has long been a need for a simple and inexpensive display system which will operate so as to enhance indications of dangerous targets, such as of intruding vessels, especially of vessels approximately at constant bearing collision courses with respect to another vessel.

SUMMARY OF THE INVENTION

The present invention relates to cooperative and integrated radio detection, navigation, and communication apparatus for permitting safe marine navigation, particularly in crowded traffic lanes and in harbors. This cooperative radio system will generally involve first and second navigation and communication stations, or a plurality of such stations; there may be relative motion between stations and some may be at fixed sites. The invention embodies a radar-radar beacon communication complex providing for the early detection and identification of intruding vessels or of fixed hazards or marker buoys and the like. Particularly, the system provides early detection of such targets through the use of mast-mounted radar beacon and transponder devices in an arrangement also affording positive object identification. Range and bearing data of an intruder may be further established by cooperative use of the radar plan position indicator and its cursors in a combination which may additionally utilize a permanent plotting paper recorder. Such a record may particularly constitute a display of dangerous constant bearing intruders, for example, as easily recognized indicia.

In one form of the invention, variable bearing traces formed at angles increasingly departing from the above indicia represent targets with threat characteristics of lesser degree. The greater the departure of the trace from the constant bearing relation, the less the associated threat of collision. Any such constant bearing line is quickly correlated with the range and azimuth location of a target indication on the plan position indicator or vice versa. The beacon enhanced returns permit the distinguishing collision-potential-indicating plot to be initiated very early in the history of the encounter, leaving the ship's officers with adequate time for determining corrective maneuvers.

DESCRIPTION OF THE PREFERRED EMBODIMENTS

An effective marine collision avoidance system must provide automatic and reliable detection of potentially dangerous targets, permit rapid assessment of that potential, provide positive identification of the targets, and permit communication therewith where desired. An effective marine collision avoidance system will employ at a representative station an omnidirectional transponder receiver having a sufficiently broad band width to detect signals lying in the bands transmitted by conventional marine radar systems, such as marine navigational radar systems conventionally operating in the X-band. The omnidirectional transponder transmitter is equipped to provide a delayed, coded, or other characteristically demarked response so as to distinguish its response from the usual surface or skin responses of its associated vessel. Thus, the transponder response is automatically distinguished on the radar plan position or other indicator. The transponder transmitter carrier signal may be an off-set dedicated frequency, so that a cooperating radar or other receiver may isolate and thus process such returns separate from a myriad of surface echoes such as sea, land, and rain echoes.

In such an arrangement, reliable interpretation of the radar display becomes feasible and automatic plotting becomes a reliable aid, permitting the radar-beacon data to be displayed so as to register the degree of threat in a form for rapid assessment by the deck officer. Once the potential threat is recognized, recorded, and assessed, it is then necessary to identify the threat and to communicate with it. For this purpose, a trainable antenna whose bearing is manually controlled may be employed. Thus directed at the source of the selected transponder signal, with its receiver tuned to the dedicated carrier frequency of the transponder transmitter, a private communication line is established, excluding undesired signals and permitting digital of other data transmission. With such a selective communication capability present, it becomes feasible for the cooperating vessels automatically to transmit vital information, including own ship's speed, heading, position, name, and the like.

Figure 1:
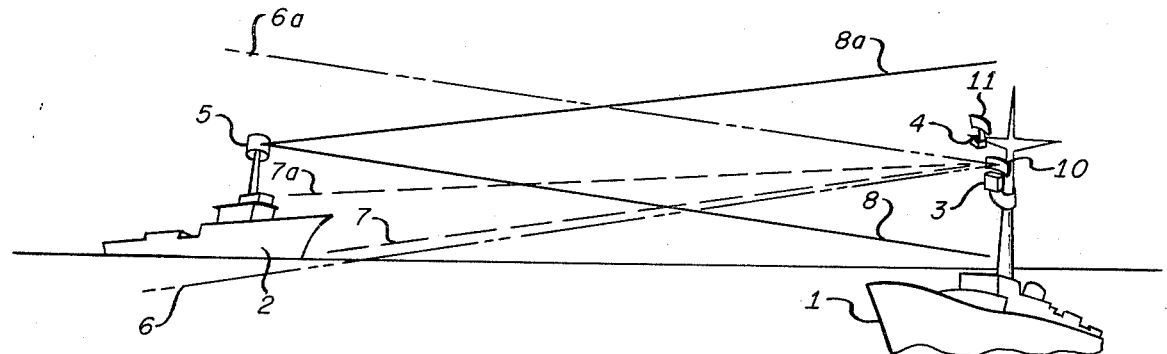
FIG. 1 represents a perspective view of two marine vessels cooperatively using the present invention.

FIG. 1 illustrates stations or marine vessels 1 and 2 equipped for such cooperative operation according to the present invention. Vessel 1 is supplied, for example, with a substantially conventional mast-mounted radar transmitter-receiver system 3 having an azimuth scannable directive antenna 10 for illuminating a ship such as vessel 2 lying generally within the elevation bounds 6, 6a of the radiation pattern of antenna 10. The portion of vessel 2 thus illuminated will return energy generally within the elevation sector 7, 7a toward antenna 10 and thus to the receiver of radar 3.

The vessel 2 may be equipped with an omnidirectional beacon transponder 5 mounted high on its mast and responsive to pulses from radar 3 for emitting enhanced-amplitude or coded beacon reply signals which may also be processed by the receiver of radar 3. Such beacon signals may be transmitted on a carrier frequency somewhat displaced from the carrier frequency of the radar system 3 for purposes which are yet to be explained. The same or other signals from beacon 5 may alternatively be received by an additional antenna such as directive or other antenna 11 associated with a pulse signal receiver 4 mounted on the mast of vessel 1. Antenna 11 or a similar device may further be used to establish a private line communication link of conventional type between vessels 1 and 2, once the bearing angle of vessel 2 is established aboard vessel 1. It will be understood that the invention may be employed in fully cooperative systems, in which case, vessel 2 will include the radio equipment shown aboard vessel 1, and vice versa. In the form of the invention shown in FIG. 2, the radar system 3 and its associated azimuth scanning radar antenna 10 may be employed for providing cooperative navigational displays 15 and 16. Display 15 takes the form of a plan position cathode ray indication, while display 16 may take the form of a continuous paper chart plotter to be described in further detail.

Radar system 3 employs a scanner antenna 10 driven via gearing 17 by drive motor 18 excited by an alternating voltage placed on terminals 23. Radar system 3 provides echo video signals in the usual manner via cable 19 to the appropriate intensifier electrodes of indicator 15. Electron beam deflection signals are also supplied in the usual manner from radar system 3 via cable 20 to the rotatable deflection yoke 22 through the brush-slip ring apparatus 21.

Yoke 22 of indicator 15 is driven in general synchronism with the azimuth rotation of antenna 10 through the agency of the selsyn data repeater system involving conventional components including selsyn generator 25, selsyn differential 26, and selsyn motor or repeater 27. The armature of selsyn generator or angle position transmitter means 25 is directly driven by gearing 17 so that the selsyn voltages on its output leads 28, 29, 30 represent the instantaneous position of antenna 10. These voltages are employed in a conventional manner to excite selsyn differential or differential data transmitter means 26.

The armature of selsyn differential 26 is coupled directly to the azimuth angle output of a directional reference such as gyroscopic compass 35 so that the armature follows the position of compass 35, maintaining a position independent of the yawing of vessel 1 on which the invention is employed. Accordingly, the selsyn voltages appearing on the differential output leads 36, 37, 38 are independent of ship's yaw.

The azimuth stabilized voltages on leads 36, 37, 38 are coupled to excite a repeater selsyn or data repeater means 27, also excited at terminals 23b by the same alternating potential as appears on terminals 23 and 23a. Consequently, the rotor of repeater 27 drives shaft 40 and gearing 41 so as to position in azimuth the deflection yoke 22 of cathode ray display 15. It will be appreciated that yoke 22 turns in precise synchronism with azimuth scanning antenna 10 except when the ship is turning or yawing and that the turning or yawing motion is subtracted from the motion of yoke 22 by differential selsyn 25. It will further be understood that a torque amplifying servo (not shown) may be interposed between gear 41 and yoke 22, as is well known to those skilled in the art, for providing greater accuracy of follow-up between yoke 22 and selsyn generator 25.

Figure 3:
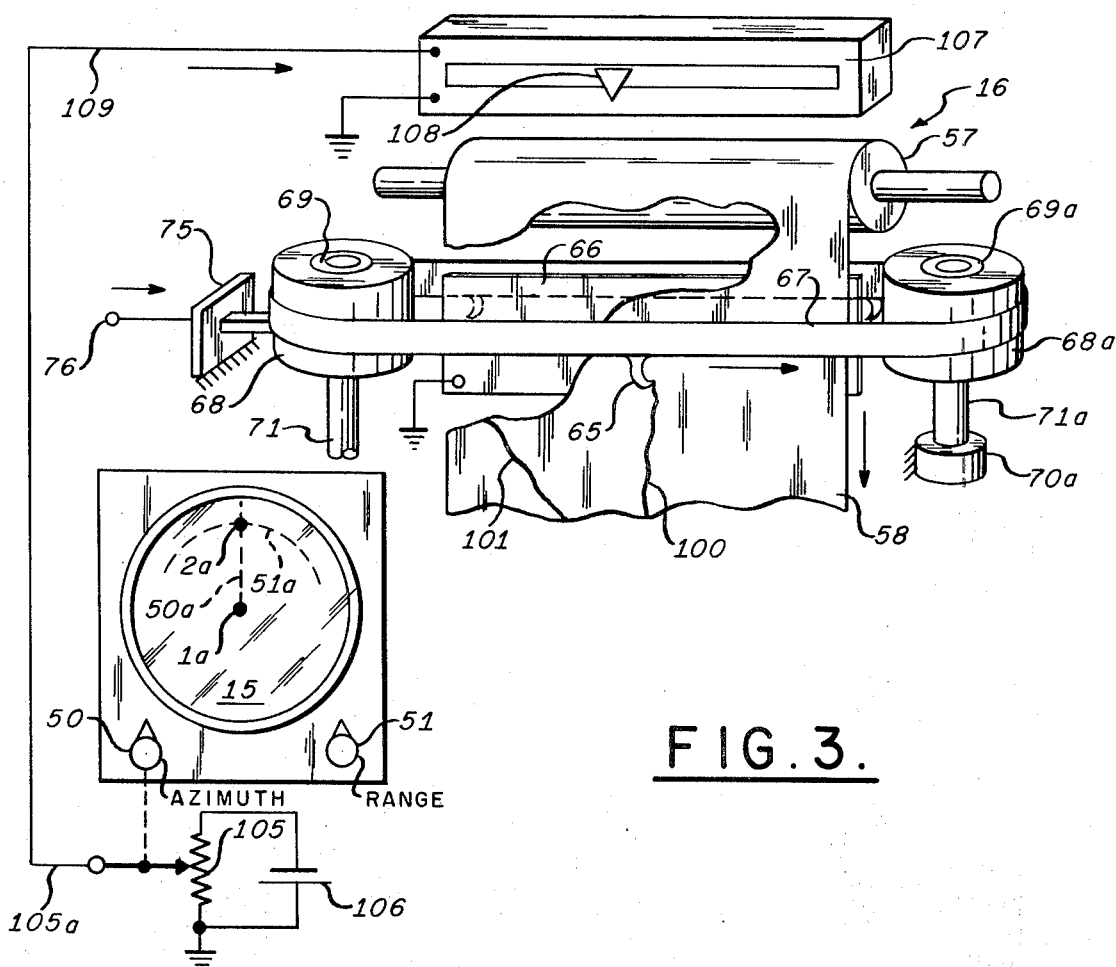
FIG. 3 is a perspective view of the chart recorder of FIG. 2, electrically connected to the plan position indicator of FIG. 2.

In operation, the plan position indicator 15 produces a conventional navigational display as shown in FIG. 3. On the circular screen of indicator 15, the indication 1a at the circle center represents own ship's position (the position of vessel 1), while indication 2a represents the position of the intruding vessel 2, for example. The radial cursor or marker 50a may be positioned in a conventional manner by rotation of cursor control knob 50 to cause marker line 50a to overlie target 2a. The circular or arcuate range marker 51a may be similarly positioned in a conventional manner by manual operation of range cursor control knob 51.

Figure 2:
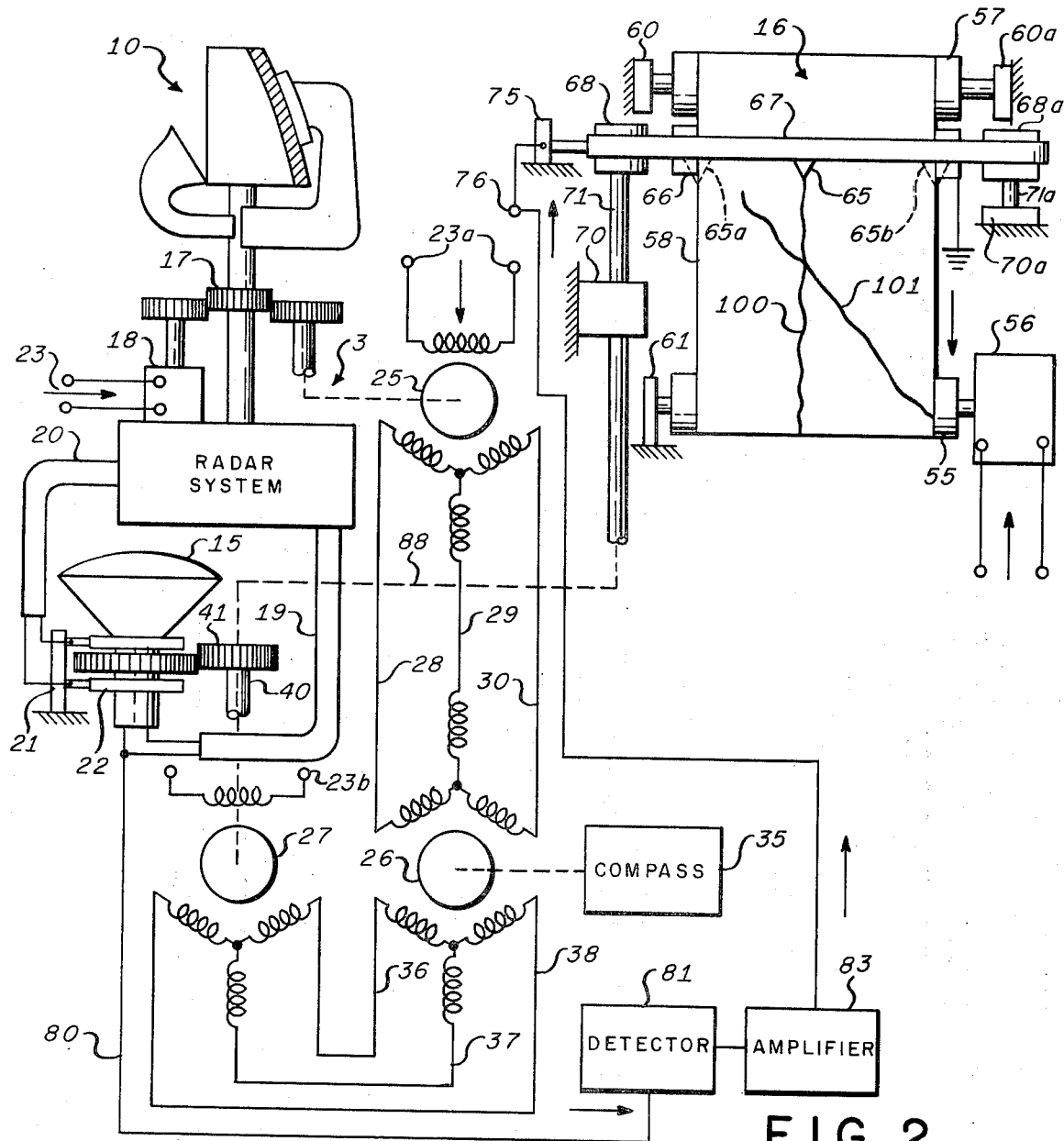
FIG. 2 is a drawing showing in elevation view a radar system, its plan position indicator, and a chart recorder display along with a circuit diagram of an electrical system for cooperative operation of the displays.

The apparatus of FIG. 2 is further provided with a plotting device 16 which may be an important aid in determining the potential collision risk due to the particular course of any intruding vessel such as vessel 2. As seen in FIGS. 2 and 3, plotter 16 utilizes a cylindrical supply drum 57 journaled at bearings 60, 60a for supplying plotting paper 58 which is rolled for storage onto the cylindrical reel drum 55 when the relatively slow speed motor 56 is operated. Drum 55 is journaled by bearing 61 and by bearings internal of motor 56. Motor 56 may operate at a constant rate or at a rate proportional to ship's forward speed.

The plotting function is performed, for example, when an electrical spark is caused to jump through the sensitive paper sheet 58 from pointer electrode 65, for example, to a grounded electrode 66 supported immediately behind the plane of sheet 58. The paper of sheet 58 may be of any convenient conventional type sensitive to the passage of an electric spark therethrough.

For positioning pointer electrode 65 in azimuth, it is supported by an endless band 67 of a suitable electrically conductive material and is coupled for rotation on drums 68 and 68a. Idler drum 68a has a shaft 71a journaled in bearing 70a, shaft 71a being insulated from drum 68a by insulation sleeve 69a. The driving drum 68 is similarly supported on a driver shaft 71 by insulating sleeve 69, shaft 71 being journaled at 70. The brush-brush holder device 75 is adapted to supply the necessary printing potential to band 67 via terminal 76. The endless band 67 is equipped with additional pointers 65a and 65b, pointers 65, 65a, and 65b being spaced apart by equal distances along endless band 67. During successive scansions of antenna 10, successive ones of pointers 65, 65a and 65b pass across the front of paper sheet 58 and are successively caused to print elements of courses of intruders such as represented by plots 100 and 101.

For the latter operation, echo or beacon video signals are supplied to pointer electrodes 65, 65a, 65b from radar system 3 via cable 19 and its extension 80. The raw video may be detected by detector circuit 81, wherein it is converted in a conventional manner into the type of amplified voltage impulse best suiting the needs of the particular recording paper 58 to be employed. The processed echo video signal is then supplied via amplifier 83, if amplification is needed, and thence to terminal 76, to the slip ring-brush device 75, and to band 67 and pointer electrodes 65, 65a, 65b.

Shaft 71, which drives drum 68 and band 67, may be driven directly by a mechanical link 88 which may be an extension of shaft 40; if desired, an appropriate follow-up servo may be used instead to drive shaft 71 in synchronism with shaft 40. Thus, antenna 10 will generally move through three revolutions while pointer electrode 65 moves once across paper 58, around drum 68a, back to drum 68 and around drum 68 to the start of its next traverse across paper 58. In such a case, there is one print made by pointer 65 on paper 58 for a given target such as vessel 2 for each three rotations of antenna 3. In the next two succeeding scans of antenna 10, pointers 65a and 65b successively print. It will be apparent that the wide dimension of paper 58 represents the full 360 angular degree excursion of antenna 10.

In operation, display 16 provides a reliable and quickly detectable indication of any potential collision situation. If vessel 2 is a threat, the trace 100 corresponding to it will be at a constant bearing and will therefore take the form of a vertical line presentation at the actual bearing of the threat (if paper 58 is moved vertically). On the other hand, variable bearing traces such as trace 101 formed off the vertical represent targets without significant threat characteristics. The greater the departure of a trace from the vertical or constant bearing relation, the less the associated threat of collision.

Any observed constant bearing trace 100 may be correlated with the range and azimuth location of a target, such as target 2a, by employing the azimuth angle cursor control 50 of FIG. 3. Cursor knob 50 is used to set cursor 50a on a particular target 2a on indicator 16 and accordingly to set the tap 105a of potentiometer 105 at a particular location. A corresponding fraction of the voltage established across potentiometer 105 by battery 106 is applied via lead 109 to a conventional lineal meter 107. If the choice of target 2a has been correct, pointer 108 of meter 107 will lie directly above vertical line 100. Inversely, the range of any target corresponding to a vertical line trace such as trace 100 may be quickly identified by moving the azimuth cursor knob 50 until pointer 108 is directly above such a vertical line 100 and then using range cursor control knob 51 in the usual manner to set range cursor 51a on the corresponding target of indicator 15.

Direct radar echoes as described in the foregoing may be employed. On the other hand, enhanced return signals from cooperating ship borne beacons may be used beneficially in the novel display system for the purpose of increasing the range of detectability of threatening vessels, providing necessary early warning especially in the instance of ships with limited maneuverability and in poor weather conditions. Further, the distinctive nature of beacon returns makes possible the distinguishing of such signals from the direct clutter echoes of land masses, rain, and the like, thus facilitating reliable navigation plotting as an aid to avoidance of collisions with other vessels.

Figure 4:
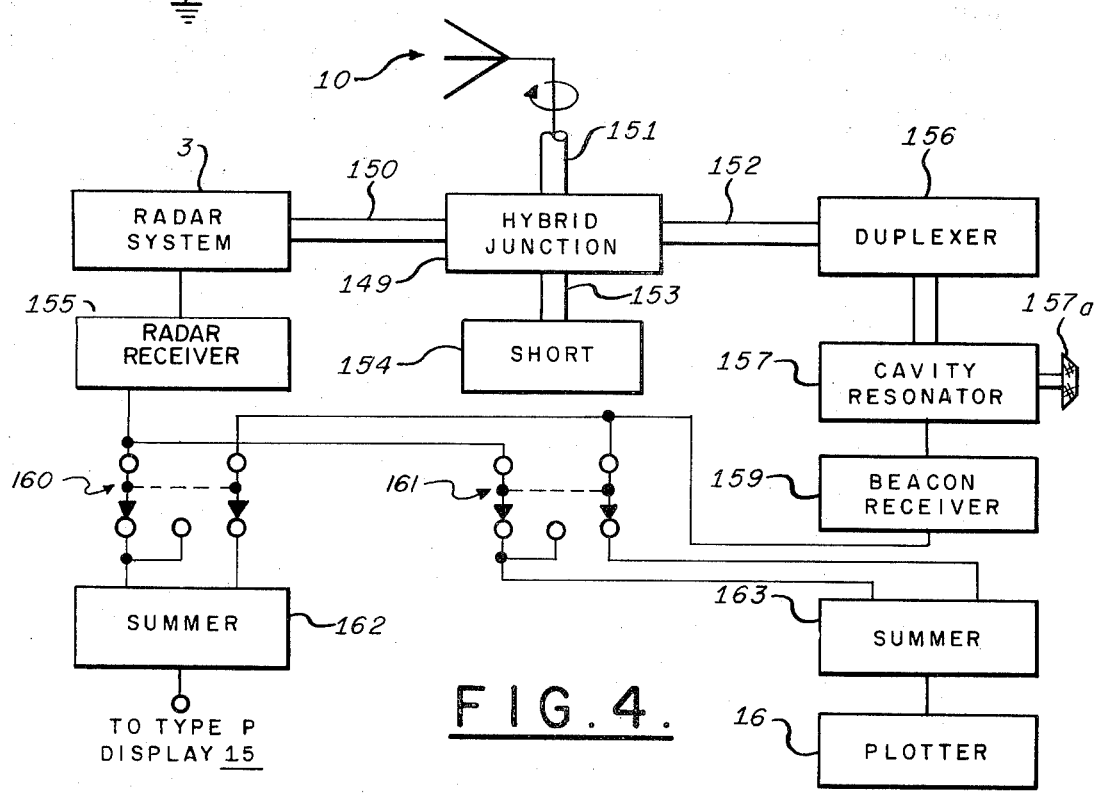
FIG. 4 is a block diagram of a beacon-radar system which may be used in the embodiment of FIG. 2.

Accordingly, the system of FIG. 2 may advantageously be modified as in FIG. 4 for permitting further cooperative operation between radar-beacon equipped vessels. In FIG. 4, the radar system 3 and scanning radar antenna 10 are again represented; however, radar system 3 is connected to one port 150 of a hybrid junction 149, while antenna 10 is connected to port 151 of the same hybrid junction 149. A third port 152 of hybrid junction 149 is coupled to duplexer 156 while a fourth port 153 is connected to an adjustable transmission line shorting device 154.

Direct radar echoes processed by radar receiver 155 may be applied to first terminals of each of selector switches 160, 161. The output of duplexer 156 may be supplied through tunable cavity resonator 157 to beacon signal receiver 159. Any outut of receiver 159 may be applied to second terminals of each of selector switches 160, 161. Switch 160 may be selectively operated to supply either radar or beacon video signals (or both) to sum circuits 162 for application, in turn, to the intensifier grids of indicator 16. In a similar manner, switch 161 may be selectively operated to supply either radar or beacon video signals (or both) to sum circuit 163 for supply, in turn, to the pointer electrode 65 of display 16. Thus, correlation of the presentations of displays 15 and 16 may be further facilitated and potential collision threats recognized by the cooperative use of displays 15, 16 earlier in the development of such threat situations.

In operation of the system of FIG. 4, carrier pulses generated by the transmitter of radar system 3 are applied to junction 150 of hybrid 149 and circulate to port 151 and out through scanner antenna 10. Any mismatch of antenna 10 with respect to port 151 is bypassed by the T-R tube of duplexer 156 attached to port 152. During reception of reflected radar pulses, these pulses are collected by antenna 10 and circulate from junction 151 to junction 152. In cavity resonator 157 is tuned to the operating frequency of the radar system, the received echoes see cavity 157 as a reactive mismatch, and the received signal continues to port 150 because of the presence of the short 154 at port 153. The radar echo is thus processed by radar receiver 155 and appears at selector switches 160, 161 for selective application to sum circuits 162, 163.

Should the beacon transponder 5 of FIG. 1 be active, cavity resonator 157 may be adjusted by tuner 157a to pass the off-set beacon frequency to beacon receiver 159. The received beacon signals are processed in the usual manner by the superheterodyne beacon receiver 159, whose output similarly appears on switches 160, 161 for selective application to displays 15, 16 at the will of the radar operator. It will be apparent to those skilled in the art that the video switches 160, 161 and the sum circuits 162, 163 may readily be arranged to mix the direct radar echo and beacon transponder signals in any combination desired by the operator.

It will be seen that the invention is particularly beneficial when used with cooperating radar and beacon systems, imposing no particular additional demands upon the time or skill of the radar operator but rather making easier his task of recognizing potential collision situations. Small vessels cooperatively equipped with beacons acquire protection at a given range equal to that afforded large vessels, and all vessels acquire an increased maximum range of detection. The latter achievement is present because of the large energy of the beacon return. Furthermore, because the beacon is a relatively small device, it may be mounted at mast top, greatly increasing useful line-of-sight distances. Maximum use is made on the plan position display 15 of the positive identification of real targets as contrasted to clutter returns and the like by virtue of the increased brilliance of the target indication on the cathode ray screen. In addition to providing rapid identification of threatening vessels, the plotter 16 provides a permanent record of all navigational events including illegal maneuvers and dangerous maneuvers on the part of intruder vessels which may in fact lead to collisions.

Figure 5:
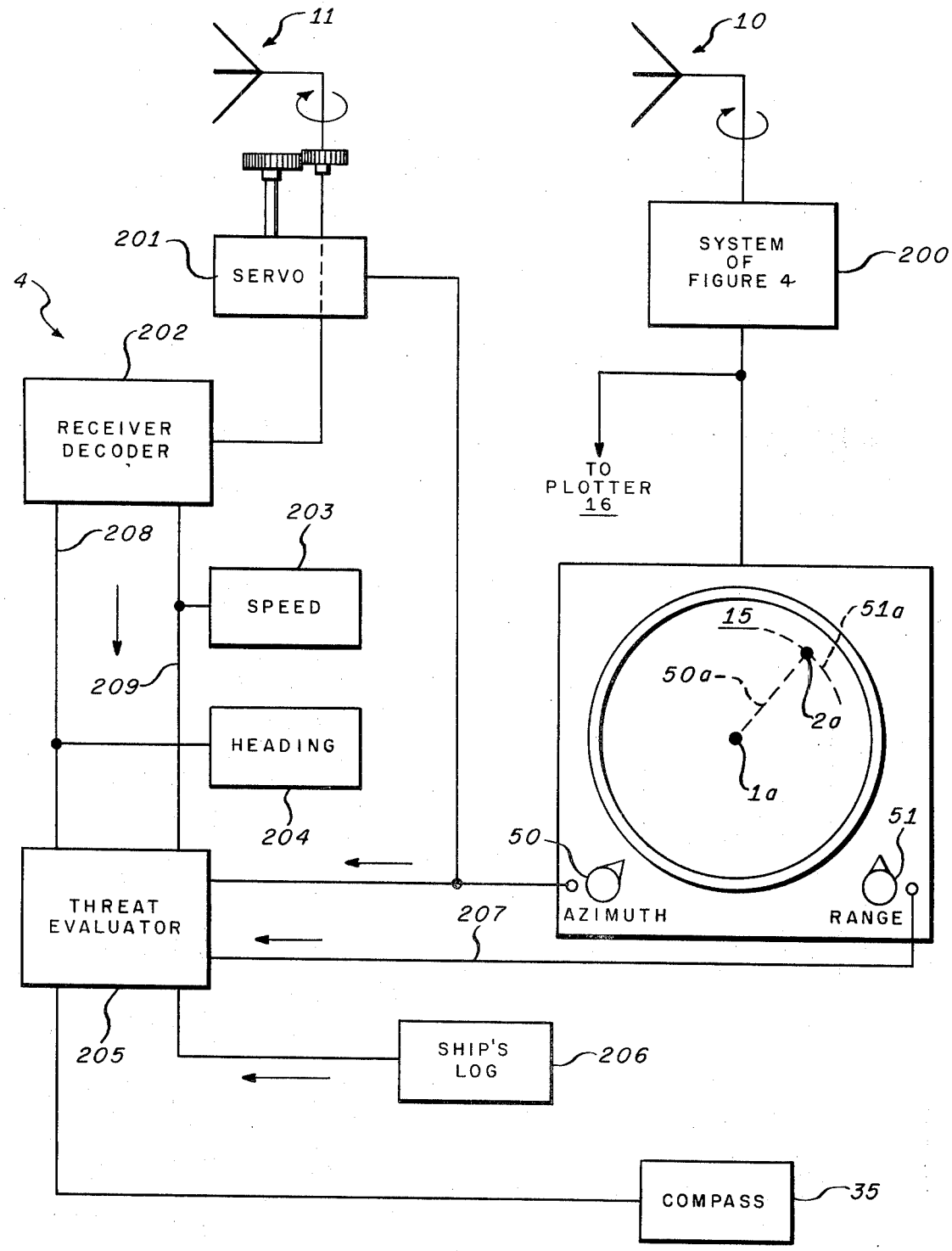
FIG. 5 is a block diagram showing how the system of FIGS. 1 and 4 may be used in an integrated navigation-communication system.

The versatility of the invention is further illustrated in FIG. 5, which figure illustrates additional apparatus for communication that may be employed in cooperation with the system 4 of FIG. 1 and its antenna 11 and the system 200 shown in FIG. 4 along with its antenna 10. As previously discussed, the radar-beacon system 200 provides an output to a plan position display 15 and to plotter 16. Display 15 is again supplied with an azimuth cursor control 50 and a range cursor control 51 as in FIG. 3. Range cursor control 51 is supplied with a battery and potentiometer combination similar to pick off elements 105, 106 of FIG. 3 or with other conventional means for generating on lead 207 a voltage proportional to the range setting of cursor knob 51. Furthermore, the communication antenna 11 is supplied with a positional servo 201 that will follow the setting of azimuth cursor knob 50. Accordingly, the operator may position directive antenna 11 by rotating knob 50 until azimuth marker 50a falls on a target 2a of interest, thus automatically positioning antenna 11 on the actual intruder ship corresponding to indication 2a. In this situation, there will be reception by antenna 11 of coded signals generated by pulse communication apparatus aboard vessel 2 in response to operation of beacon-transponder 5. Such apparatus may generate pulse coded signals for transmitting the speed and heading of vessel 2, and other information of significance, including voiced communications. Private line pulse communication equipment of well known type may be used for this purpose, including the apparatus of the W.L. Lassetter U.S. Pat. No. 3,320,610 for a "Detection, Identification, and Communication System," issued May 16, 1967 and assigned to the Sperry Rand Corporation. Selective communication between vessel 1 and an individual intruder such as vessel 2 may also be accomplished by use of coded selective systems such as disclosed by R.J. Phelps in the U.S. Pat. No. 2,740,106 for a "Private Line Communication System," issued March 27, 1956 and by the same inventor in U.S. Pat. No. 2,812,509 for a "Private Line System", issued Nov. 5, 1957, both patents being assigned to the Sperry Rand Corporation.

As shown in FIG. 5, the selected code communication signals may be applied to receiver-decoder 202 for separating the classes of data communicated and supplying each such class on a distinct output lead, such as leads 208, 209. As will be appreciated, the channelled data may be separately displayed in a conventional manner, as represented by speed indicator 203 and heading indicator 204 for displaying the respective speed and heading of vessel 2. It is understood that indicators 203 and 204 are merely representative devices, and that other data may be similarly displayed to the operator in the vicinity of navigational displays 15 and 16.

The versatility of the invention is further indicated by the fact that the data generated by the apparatus of FIGS. 2, 3, and 4 may be supplied to collision avoidance or ship's maneuver assessment apparatus such as threat evaluator 205. For example, azimuth and range data pertaining to vessel 2 may be provided to threat evaluator 205 from cursor controls 50, 51 and in properly decoded form by receiver-decoder 202, along with own ship's speed from log 206, directional data from own ship's compass 35, and other pertinent data such as may be required. Evaluator or assessment devices such as threat evaluator 205 are illustrated in further detail for example, in the R.F. Riggs U.S. Pat. application Ser. No. 87,025 entitled "Ship's Maneuver Assessment System", filed Nov. 5, 1970 now U.S. Pat. No. 3,717,873, and in the U.S. Pat. application Ser. No. 90,558 by H.J. Fleischer, P. Lipsky, and B.V. Tiblin for a "Collision Avoidance Display Apparatus for Maneuverable Craft," filed Nov. 18, 1970, both patent applications being assigned to the Sperry Rand Corporation.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. A radio system for navigation and for avoiding collisions between first and second stations comprising:
beacon transponder means adapted to be mounted at an elevated position on said first station,
azimuth scanning radar transmitter means mounted on said second station for irradiating said first station and said beacon transponder means,
radar receiver means mounted on said second station for receiving signals in response to the irradiation of said first station,
beacon receiver means mounted on said second station for receiving signals in response to operation of said beacon transponder means,
means including indicator means for forming a display selectively in response to said radar and said beacon receiver means for collision avoidance purposes,
plotter means for forming a permanent record in a medium selectively in response to said radar and said beacon receiver means,
said plotter means comprising printer means movable along a first path adapted to mark said medium moving along a second path substantially at right angles to said first path,
said plotter means being so constructed and arranged that said intensifying signals produce a lineal marking substantially parallel to said second path only for a station having substantially a constant bearing course with respect to said second station for collision warning purposes, azimuth cursor control means for cooperative operation with said indicator means, pick-off means responsive to said azimuth cursor control means, and lineal electrical meter means cooperating with said printer means and having pointer means responsive to said pick-off means for motion substantially parallel to said first path, said cursor control means, said pick-off means, and said lineal meter means being adapted for correlation of the identification of selected station representations shown on said indicator means and on said medium.

2. Apparatus as described in claim 1 additionally comprising:

range cursor control means for cooperative operation with
said indicator means,
said range cursor control means being adapted to identify the range of said selected station.

3. A radio navigation collision avoidance system including an azimuth scanning radar system of the type supplying electron beam intensifying signals representing an object irradiated by said radar system to plan position indicator means, said system comprising:

azimuth scanning antenna means for collecting signals from said irradiated object, deflection means for supplying electrical azimuth-stabilized deflection signals to said plan position indicator means for deflecting the cathode ray beam thereof when intensified, said deflection means comprising: antenna azimuth angle position transmission means, differential data transmitter means responsive to said antenna position transmitter means and to compass means, and data repeater means responsive to said differential data transmitter means, printer means movable along a first path adapted to mark a medium moving along a second path substantially at right angles to said first path, means responsive to said deflection means for moving said printer means along said first path, and means for supplying said electron beam intensifying signals to said printer means for marking said moving medium with object course defining markings.

4. Apparatus as described in claim 3 wherein said deflection means additionally comprises:

rotatable electron beam deflection yoke means disposed in electron beam deflecting association with said plan position indicator means for receiving said azimuth deflection signals and positioned in response to said data repeater means.

5. Apparatus as described in claim 4 wherein said printer means is moved along said first path in response to said data repeater means.

6. Apparatus as described in claim 5 wherein said printer means includes medium-supply drum means and driven drum means adapted to move said medium along said second path from said medium-supply drum means to said driven drum means.

7. A radio navigation collision avoidance system including an azimuth scanning radar system of the type supplying electron beam intensifying signals representing an object irradiated by said radar system to plan position indicator means, said system comprising:

deflection means for supplying electrical azimuth-stabilized deflection signals to said plan position indicator means for deflecting the cathode ray beam thereof when intensified, printer means movable along a first path adapted to mark a medium moving along a second path substantially at right angles to said first path, means responsive to said deflection means for moving said printer means along said first path, and means for supplying said electron beam intensifying signals to said printer means for marking said moving medium with object course defining markings, said printer means being so constructed and arranged that said intensifying signals produce a lineal marking substantially parallel to said second path only for an object having a substantially constant bearing course with respect to said collision avoidance system for collision warning purposes, azimuth cursor control means for cooperative operation with said plan position indicator means, pick-off means responsive to said azimuth cursor control means, and lineal electrical meter means cooperating with said printer means and having pointer means responsive to said pick-off means for motion substantially parallel to said first path, said cursor control means, said pick-off means, and said lineal meter means being cooperatively adapted for correlation of the identification of a selected object representation shown on said plan position indicator means and on said medium.

8. Apparatus as described in claim 7 additionally comprising:

range cursor control means for cooperative operation with
said plan position indicator means,
said range cursor control means being adapted to identify the range of said selected object.

9. A radio system for navigation and for avoiding collisions between first and second stations comprising:

omnidirectional transponder receiver means at said first station for detecting the full frequency range of an operating marine navigation radar system located at said second station, omnidirectional transponder transmitter means at said first station for transmitting a characteristic signal in response to said detected marine radar signal toward said radar system for automatically distinguising said characteristic signal from normal echo responses from said first station, said transponder transmitter signal being tuned to an off-set dedicated frequency for permitting isolation of said transmitter signal returns from said normal echo responses.

display means at said second station responsive to said radar system for displaying the bearing of said transponder transmitter signal returns to register the degree of threat of collision between said two stations, and directive communication antenna means selectably positionable according to the observed value of said bearing for establishing private line communication with said transponder for transmission of data for collision avoidance purposes.

* * * * *